United States Patent [19]

Calvillo et al.

[11] Patent Number: 4,804,470

[45] Date of Patent: Feb. 14, 1989

[54] PAINT STRAINER

[76] Inventors: Carlos P. Calvillo; Rick L. Lykins, both of 2352 Harbor Blvd., Apt. 203, Costa Mesa, Calif. 92626

[21] Appl. No.: 916,601

[22] Filed: Oct. 8, 1986

[51] Int. Cl.⁴ ............................................. B01D 23/28
[52] U.S. Cl. .................................... 210/232; 210/250; 210/469; 210/474; 248/94; 248/324
[58] Field of Search ............... 210/232, 464, 469, 474, 210/477, 478, 479, 481, 482, 249, 250; 248/94, 213.2, 312.1, 324

[56] References Cited

U.S. PATENT DOCUMENTS

| | | | |
|---|---|---|---|
| 2,239,132 | 4/1941 | Ware | 210/482 |
| 2,667,976 | 2/1954 | Weidner | 210/469 |
| 2,883,057 | 4/1959 | Richards | 248/94 |
| 4,025,435 | 5/1977 | Shea | 210/469 |

FOREIGN PATENT DOCUMENTS

| | | | |
|---|---|---|---|
| 20761 | of 1913 | United Kingdom | 210/474 |
| 9943 | of 1914 | United Kingdom | 210/474 |
| 283320 | 1/1928 | United Kingdom | 210/474 |
| 755614 | 8/1956 | United Kingdom | 210/474 |

Primary Examiner—Richard V. Fisher
Assistant Examiner—Wanda L. Millard
Attorney, Agent, or Firm—Roy A. Ekstrand

[57] ABSTRACT

An improved paint strainer for use in straining a liquid paint and depositing the same within a reservoir container has an upwardly extending continuous closed wall surface having means for attachment to the paint reservoir on its lower end and a strainer bag comprising a mesh material covering the upper opening of the paint strainer and extending downwardly within the closed wall portion of the paint strainer. In one embodiment, the paint strainer is disposable while in another embodiment, the paint strainer is intended for repeated use and cleaning.

10 Claims, 1 Drawing Sheet

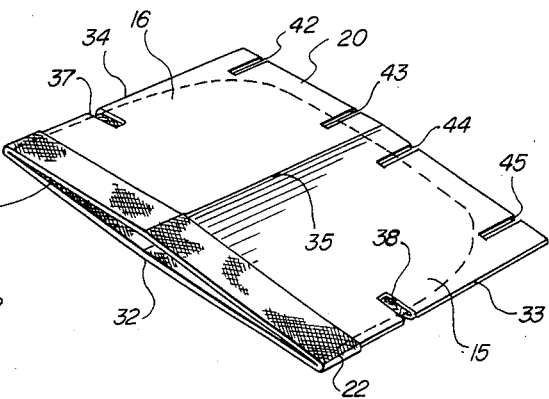
FIG. 1
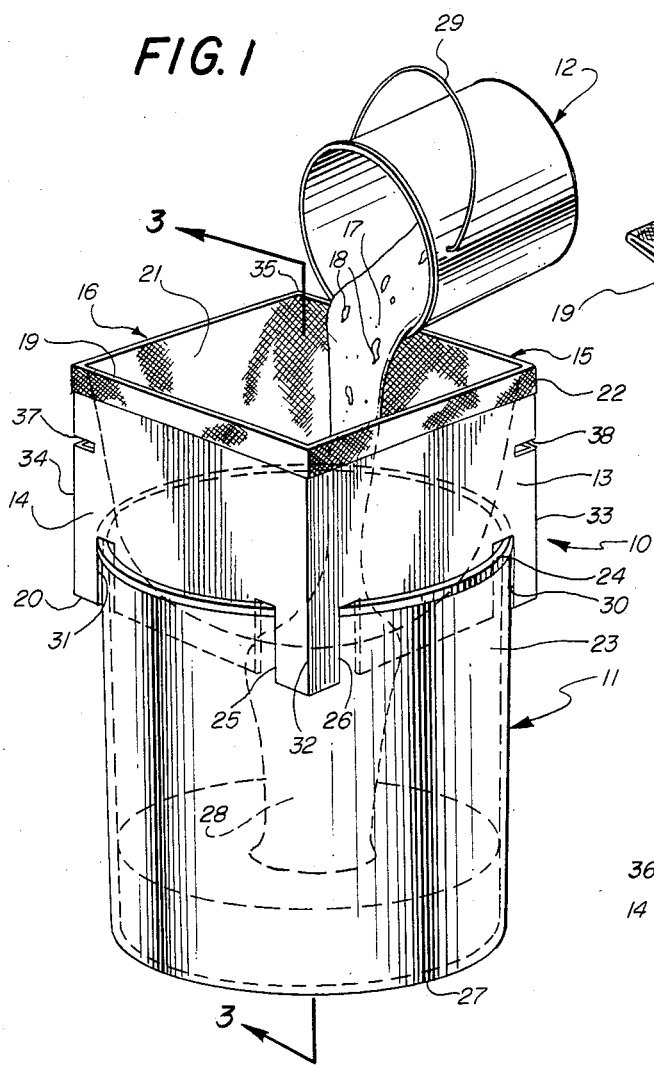
FIG. 2
FIG. 3
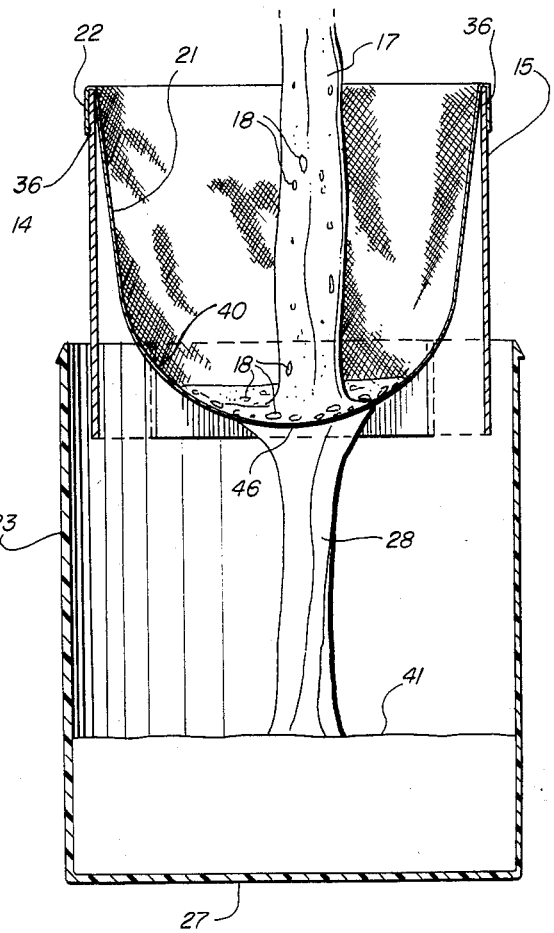
FIG. 4
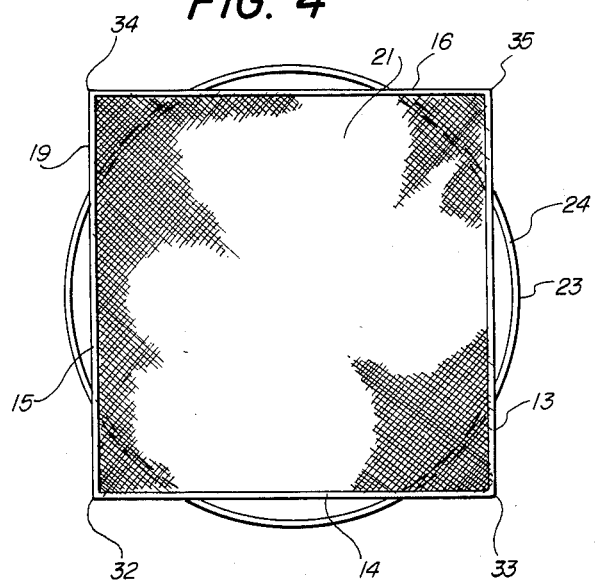

U.S. Patent Feb. 14, 1989 Sheet 2 of 2 4,804,470
FIG. 5
FIG. 7
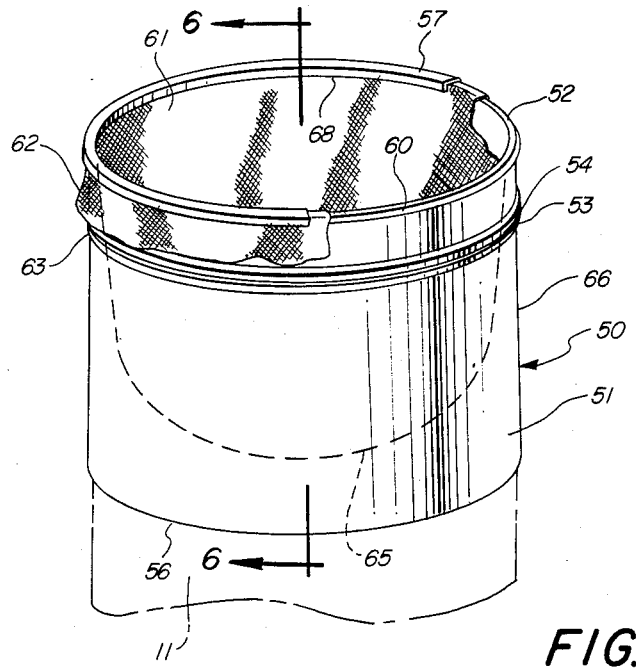
FIG. 6
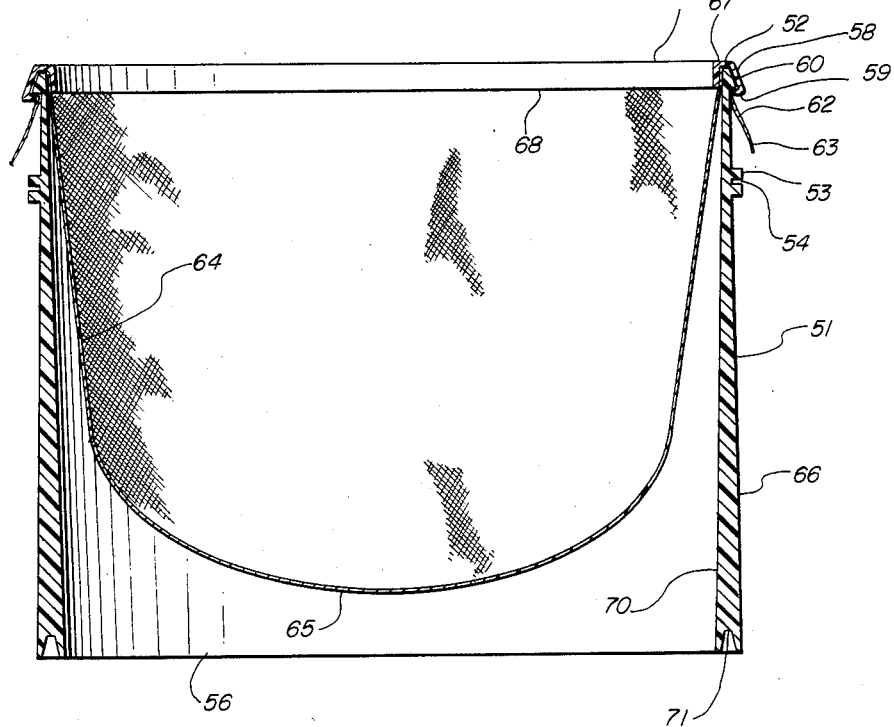

PAINT STRAINER

FIELD OF THE INVENTION

This invention relates generally to painting apparatus and particularly to paint strainers used in combination and cooperation with painting apparatus.

BACKGROUND OF THE INVENTION

The majority of paints used today comprise mixtures of several elements and ingredients, including the liquid paint thinner or vehicle, the color pigment, various thickening agents and certain chemicals included to control the cure or drying rate of the paint. Typically, the ingredients in such paints include materials which are liquid and materials which are solid particulate matter suspended in the liquid components of the paint. As a result of the combination of such a variety of elements within typical paint mixtures and the provision for curing or drying of such paint mixtures, there is a tendency, in even the finest quality paints, for lumps or collections of partially cured or solidified particulate matter to form within the paint during processing and storage time. In addition, the presence of impurities and foreign material within such paints produces further inconsistency of texture and often contributes lumps or solid objects within the paint. Further, and particularly in connection with paints used in outdoor applications, contaminants often find their way to the paint in the form of dirt and other typical outdoor contaminants to provide a further accumulation of bits and pieces of foreign material within the paint mixture during use.

As a result, painters often contend with inconsistencies, foreign materials and partially solidified lumps or other variations of texture in the paint which they apply. In applications of such paint utilizing the common devices, such as brushes, rollers or paint pads, the presence of such inconsistencies, foreign materials and lumps is a nuisance and sometimes requires removal from the painted surface but can, in most cases, be dealt with by the careful painter.

However, in recent years, a substantial number of painters, particularly those operating in the painting of houses or other dwelling structures, have opted to utilize paint spraying devices to cover the majority of large painted areas. For example, residential and commercial building painters often spray the majority of surfaces to be painted leaving touch-up and trim portion to be covered using more conventional brush and roller techniques.

While many types of spray painting apparatus have been developed through the years to meet the needs of painters, the most common includes the basic system components of an air compressor, a spray gun, a paint reservoir and a plurality of interconnecting hoses. The basic system function provides that air pressure from the compressor is utilized to drive the paint through the spray gun. In some systems, the paint and compressed air are joined at the spray gun in what amounts to a siphon feed action operation in which air passing through the spray gun draws paint through a connecting hose between the spray gun and the paint reservoir. In other systems, the paint is transferred from a reservoir to a pressurized chamber pumped with sufficient pressure to drive the paint under through the spray gun and onto the painted surface.

While such paint sprayers offer a substantial increase in speed and quality of painting attainable by painters, the spray guns themselves contain relatively small paint passages and nozzle orifices and are therefore extremely sensitive to being clogged by particles, foreign matter and lumps within the paint. In most situations, a clogged gun must be immediately removed from the system and completely or partially disassembled or otherwise cleaned and freed of the clogging material before the painting operation may be resumed. As can be imagined, the need to frequently interrupt the painting process to clean a clogged spray gun or associated spraying apparatus is time consuming and costly to the painters.

As a result of the problems caused by clogged spray guns, the practitioners in the painting art have adopted the use of various paint straining devices with the object of preventing clogging particulate matter and lumps from reaching the sensitive spray gun. The most common paint sprayer in use among commercial painters comprise a flexible mesh filter bag which is positioned over the top of the paint reservoir and allowed to sag or extend downwardly into the reservoir while having its remaining portion draped over the reservoir sides. Paint is then poured through the paint strainer into the reservoir before use. Once the remainder of paint has passed through the strainer bag, the strainer is lifted by its sides and the residual of paint is squeezed through the paint strainer by the painters hand squeezing action. Thereafter, the strainer bag and any accumulated lumps or particles which have been filtered out by the straining process are disposed of.

While this method of straining does remove the majority of particulate matter and lumps from the paint to be used, its use is inconvenient, time consuming and messy, leading to the situation where the majority of painters simply do not like to use such strainers. As a result of the extent of painter's dislike for using the above-described strainers, some often elect to avoid the paint straining operation entirely and assume the risk of a clogged spray gun.

There remains therefore a need in the art for an effective, convenient, clean and easy to use paint strainer which avoids the foregoing described problems.

SUMMARY OF THE INVENTION

Accordingly, it is a general object of the present invention to provide an improved paint strainer. It is a more particular object of the present invention to provide an improved paint strainer which may be used without subjecting the user to the need of hand squeezing the strainer filter to remove paint residue.

In accordance with the invention there is provided for use in straining a liquid paint and depositing the same within a reservoir container, an improved paint strainer having an upwardly extending continuous closed wall surface having means for attachment to the paint reservoir on its lower end and a strainer bag comprising a mesh material covering the upper opening of the paint strainer and extending downwardly within the closed wall portion of the paint strainer.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 1 is a perspective view of an improved paint strainer constructed in accordance with the present invention;

FIG. 2 is a perspective view of the improved paint strainer shown in FIG. 1 in its folded or storage position;

FIG. 3 is a section view of the present invention improved paint strainer taken along section lines 3—3 in FIG. 1;

FIG. 4 is a top view of an improved paint strainer constructed in accordance with the present invention;

FIG. 5 is a perspective view of an alternate embodiment of the present invention improved paint strainer;

FIG. 6 is a section view of the alternate embodiment of the present invention improved paint strainer shown in FIG. 5 taken along section lines 6—6 therein; and FIG. 7 is a partial section view of the nesting portion of the present invention improved paint strainer.

DESCRIPTION OF THE PREFERRED EMBODIMENTS

FIG. 1 sets forth a perspective view of a paint strainer generally referenced by the numeral 10 in a typical application. A generally cylindrical reservoir 11, which may for example comprise the commonly used five gallon containers in which paint is often purchased for commercial application, includes a cylindrical wall 23 and a substantially planar reservoir bottom 27. Reservoir bottom 27 and cylindrical wall 23 are joined at the lower edge of cylindrical wall 23 to form a liquid retaining container. Cylindrical wall 23 terminates on its upper end in a substantially straight edge 24 which may include means for attaching a generally planar lid used to seal reservoir 11 (not shown). In accordance with the invention, paint strainer 10 defines a plurality of substantially planar side walls 13, 14, 15 and 16. Sidewalls 13 and 14 are joined at a corner 32 and sidewalls 14 and 16 are joined at a corner 34. Similarly, sidewalls 13 and 15 are joined at a corner 33 and sidewalls 15 and 16 are joined at a corner 35. The resulting structure of sidewalls 13 through 16 is a substantially square cross-sectioned prism defining an upper opening surrounded by a continuous upper edge 19 about the top portion of paint strainer 10 and a lower opening surrounded by a similar lower edge 20 about the bottom portion. In addition, sidewall 13 defines a pair of substantially rectangular notches 30 and 26 while sidewall 14 defines a similarly placed pair of notches 25 and 31 which interupt lower edge 20. In addition, while not visible in FIG. 1 due to the perspective view, sidewall 16 and sidewall 15 define similarly placed notches 42 through 45 in lower edge 20 which may be seen in FIG. 2.

In accordance with an important aspect of the present invention, paint strainer 10 rests upon upper edge 24 of cylindrical wall 13 of reservoir 11 such that a portion of cylindrical wall 23 extends upwardly into the notches formed in sidewalls 13 through 16. As a result, corners 32, 33, 34 and 35 of paint strainer rest outside of the perimeter of cylindrical wall 23, while the portions of sidewalls 13 and 14, between notches 30 and 26 and notches 25 and 31 respectively in sidewalls 13 and 14, pass within the interior of cylindrical wall 23. Similarly, sidewalls 15 and 16 are of identical structure to sidewalls 13 and 14 and define notches 42 through 45 therein such that corners 33, 34 and 35 also rest outside cylindrical wall 23 with portions of sidewalls 15 and 16 traversing the interior of cylindrical wall 23. A mesh-like strainer bag 21, preferably formed of a plastic mesh material and comprising a generally tapered bag structure, is positioned within the interior of sidewalls 13 through 16 and extends downwardly therebetween. A portion of strainer bag 21 extends outwardly from upper edge 19 of paint strainer 10 and is folded downwardly against the exterior portions of sidewalls 13 through 16 to form an overlap 22 which extends about the upper portion of sidewalls 13 through 16. In accordance with one embodiment of the invention, overlap 22 is attached to the underlying portion of sidewalls 13 through 16 by a suitable adhesive such that strainer bag 21 is secured to upper edge 19 of paint strainer 10. Of course, virtually any attachment may be utilized without departing from the invention.

A paint can 12 exemplifies the typical paint straining application to which the present invention pertains in that a stream of paint 17 is poured downwardly from paint can 12 into the interior of paint strainer 10. Paint stream 17 is shown to include a plurality of particulate materials and the like comprising paint lumps 18 which are suspended within paint stream 17 and carried downward into strainer bag 21. As paint stream 17 encounters the lower portion of strainer bag 21, the mesh construction of strainer bag 21 permits a portion of paint stream 17 to pass through the holes in strainer bag 21 to emerge and pass downwardly as filtered paint stream 28. In addition, and depending upon the speed at which paint stream 17 is poured from paint can 12 and the thickness of the paint, a certain amount of paint stream 16 begins collecting within strainer bag 21. The paint within filtered paint stream 28 then accumulates and is collected within the interior of reservoir 11.

As can be seen, and in accordance with an important aspect of the present invention, the notches within sidewalls 13 through 16 cooperate with cylindrical wall 23 to firmly secure paint strainer 10 upon reservoir 11 in a removable attachment which leaves the users hands free to manipulate paint can 12 during the process of transferring paint from paint can 12 to reservoir 11 through strainer bag 21.

A second set of notches 37 and 38 are defined in sidewalls 14 and 16 and in sidewalls 13 and 15 respectively. Notches 37 and 38 are used to receive the handle of containers such as handle 29 of paint can 12 during the pouring of paint. In the position shown in FIG. 1, paint can 12 is lowered until it rests atop paint strainer 10 and handle 29 is rotated downwardly to the underside of paint can 12 and into notch 38. If desired, a second paint can may be placed atop paint strainer 10 in a mirror image position with respect to paint can 12. In such case, the handle of the second paint can is received by notch 37. The advantage of using notches 37 and 38 is that the containers may be left unattended to continue pouring and draining while the painter attends to other tasks.

FIG. 2 shows paint strainer 10 in its folded or storage position in which paint strainer 10 has essentially been collapsed or folded flat by closing the angles on corners 33 and 34. In the position shown, the paint strainer assumes a substantially flat configuration in which sidewalls 13 and 14 are essentially coplanar as are sidewalls 15 and 16 (not seen in FIG. 2). Accordingly, corners 32 and 25 have increased the included angle to form a substantially straight line connection between sidewalls 13 and 14 and between sidewalls 15 and 16. As can be seen, lower edge 20 of sidwalls 15 and 16 defines a plurality of notches 42, 43, 44 and 45 which are identical in structure and location to notches 31, 25, 26 and 30 of sidewalls 14 and 13 respectively. As can also be seen in FIG. 2 with paint strainer 10 in its collapsed or folded position, strainer bag 21 assumes a substantially flat configuration (shown in dashed line form). The position of paint strainer 10 shown in FIG. 2 is that which is utilized in storage and shipment of the present invention paint strainer in that a plurality of paint strainers in the collapsed position may be readily stacked and stored in a small space. Notches 37 and 38 may also be seen extending inwardly at corners 34 and 33 respectively.

FIG. 3 shows a section view of paint strainer 10 taken along section lines 3—3 in FIG. 1 showing sidewalls 14 and 15 supporting strainer bag 21 as paint stream 17 is passed therethrough to emerge as filtered paint stream 28. As mentioned, the notches within paint strainer 10 support paint strainer 10 upon edge 24 of cylindrical walls 23 of reservoir 11. Under the weight of accumulating paint from paint stream 17, strainer bag 21 assumes a substantially tapered shape and concave portion 40 which terminates in a curved lower portion 46. In accordance with the filtering action of strainer bag 21, the plurality of lumps 18 within paint stream 17 are collected on the upper portion of strainer bag 21 in the region of lower portion 46 and do not pass through strainer bag 21.

An adhesive 36 is interposed between sidewalls 14 and 15 as wells as sidewalls 13 and 16 and overlap 22 to securely attach strainer bag 21 thereto. As will be apparent to those skilled in the art, the weight of accumulated paint during the pouring and filtering process tending to collect in lower portion 46 of strainer bag 21 tends to cause concave portion 40 of strainer bag 21 to be drawn inwardly away from the interior of the sidewalls of paint strainer 10.

FIG. 4 shows a top view of paint strainer 10 secured to reservoir 11 in the position shown in FIG. 1. As can be seen, strainer bag 21 extends continuously from upper edge 19 of sidewalls 13 through 16 and covers the entire cross-section of the square prism formed by sidewalls 13 through 16.

In accordance with an important aspect of the present invention, the ability of paint strainer 10 to assume the position shown in FIG. 2 provides an additional advantage of the present invention structure beyond the compact storage set forth above. While sidewalls 13 through 16 may be fabricated from virtually any material, in the preferred form, they are fabricated using a relatively inexpensive and preferably disposable material such as pressed cardboard, fabricated paper or inexpensive molded plastic. Accordingly, paint strainer 10 may be regarded, if so constructed, as disposable. As a result, the necessity of washing and cleaning the residual paint from the paint strainer is avoided. Instead, when fabricated inexpensively enough to be disposable, paint strainer 10 may simply be discarded after use.

In most operations of commercial painting, reservoir 11 requires periodic refilling in order to resupply the paint spraying apparatus. In most circumstances, prior to the present invention, this has required the exercise of a substantially burdensome and messy process in which the filter material is removed from the reservoir and excess and accumulated paint within the filter is expelled by squeezing or ringing the filter material. In addition, the prior art filtered materials require some care to be exercised in their disposal due to their tendency to drip the residual paint accumulated in the filter. The present invention structure however provides for the squeezing out of residual paint within strainer bag 21 by simply folding paint strainer 10 to the configuration shown in FIG. 2 while holding the paint strainer above reservoir 11.

As will be apparent to those skilled in the art, as corners 32 and 35 are brought together, strainer bag 21 is compressed between sidewalls 13 through 16 causing virtually all of the residual paint accumulated within the strainer bag 21 to be quickly and cleanly expelled from the strainer bag. As a result, the need for the user to directly contact the paint during the process of emptying strainer bag 21 is avoided. In addition, because sidewalls 13 through 16 surround and enclose strainer bag 21 in the folded position of FIG. 2, excessive dripping of residual paint is avoided because the paint residue tends to adhere to the sidewalls and the folded paint strainer while still in the position shown in FIG. 2, may readily be discarded, or in the alternative, moved to another paint reservoir for continued use in the paint filtering process. In order to enhance the above-described process and further minimize or eliminate the tendency of the residue within strainer bag 21 to drip, sidewalls 13 through 16 may, if desired, be fabricated such that their interior surfaces are absorbative and therefore have a tendency to draw the paint residue, thereby further impeding running or dripping from strainer bag 21.

FIG. 5 sets forth an alternate embodiment of the present invention paint strainer generally referenced by reference numeral 50 which comprises a cylindrical wall 51 which is preferably formed of a molded plastic material and which defines a bottom edge 56 and an upper edge 52. Cylindrical wall 51 further defines an exterior surface 66 and an interior surface 70 as well as an annular rib 53 extending about the perimeter of cylindrical wall 51 and outwardly from outer surface 66. Rib 53 is substantially parallel to upper edge 52 and defines a recessed groove 54 therein. Cylindrical wall 51 further defines a bevel 60 extending downwardly and outwardly from upper edge 52. An annular snap ring 57 formed of a resilient plastic material or the like encirlces and snaps to upper edge 52 of cylindrical wall 51 and engages bevel 60. A mesh strainer bag 61, similar in construction to strainer bag 21 of the above-described embodiment, defines a generally closed end filter bag terminating at one end in a filter bottom 65 and at the other end in an open top 63. In accordance with the invention, strainer bag 61 extends downwardly within the interior of paint strainer 50 at its closed end, while the upper open portion of strainer bag 61 extends outwardly across upper edge 52 of cylindrical wall 51 beneath snap ring 57 and downwardly along the outside of cylindrical wall 51. Top edge 63 of strainer bag 61 is captivated between snap ring 57 and upper edge 52 which cooperate to secure the upper portion of strainer bag 61 to cylindrical wall 51 such that an overlap 62 is formed about the upper exterior portion of cylindrical wall 51.

FIG. 6 sets forth a section view of the alternate embodiment of FIG. 5 taken along section lines 6—6 and showing cylindrical wall 51 as defining a generally flat outer surface 66 and a generally flat inner surface 70. It should be noted that outer surface 66 and inner surface 70 generally diverge from a relatively close spacing at the top of cylinder 51 to a broader spacing at the bottom thereof. In accordance with an important aspect of the present invention, cylindrical wall 51 further defines a generally v-shaped groove 71, the details of which are better seen in FIG. 7, which extends upwardly from bottom edge 56 of cylindrical wall 51. Snap ring 57 comprises a generally annular portion 67, a right angled downwardly extending rim 68, a beveled portion 58 and an inwardly extending lip 59. With strainer bag 61 in place, snap ring 57 is installed by placing rim 68 proximate the interior of upper edge 52 and forcing snap ring 57 downward such that lip 59 slides across bevel 60 and snaps under bevel 60 to captivate strainer bag 61.

In accordance with the invention, the embodiment shown in FIGS. 5 and 6 functions in substantially the same manner as the embodiment shown in FIGS. 1 through 4 in that paint is poured into the interior portion of strainer bag 61 and passes through the mesh-like structure thereof to emerge therefrom substantially free of lumps and particles of sufficient size to create problems in the typical paint spraying equipment. It should be noted that while strainer bag 61 is in its preferred embodiment formed of a plastic mesh or similar material, virtually any flexible filter material capable of being formed into the general bag structure of strainer bag 61, and strainer bag 21 of the alternate embodiment, may be utilized. In its preferred form however, strainer bag 61 comprises a material having sufficient strength and water and solvent resistance to be washable and reuseable. In contrast, the strainer bag 21 utilized in the embodiment shown in FIGS. 1 through 4 may, in keeping with the disposable objectives of that embodiment, be fabricated from a disposable material such as filter paper.

FIG. 7 sets forth a partial section view of the junction of reservoir 11 and cylindrical wall 51. As should be noted, cylindrical wall 51 of paint strainer 50 is fabricated so as to have substantially the same diameter as reservoir 11. In the event reservoir 11 and cylindrical wall 51 have virtually identical diameters, the nesting or fit of cylindrical wall 51 upon edge 24 of reservoir 11 assumes the orientation shown in FIG. 7. As can be seen, groove 71 in cylindrical wall 51 defines a pair of inwardly tapered bevel surfaces 72 and 73 which provide a tapered cross-section for groove 71.

In the event reservoir 11 varies in its diameter from the diameter of cylindrical wall 51, the presence of beveled surfaces 72 and 73 permit groove 71 to receive edge 24 notwithstanding variations in diameter between reservoir 11 and cylindrical wall 51. In such case, the inclined surfaces of bevel 73 and 72 cooperate to permit paint strainer 50 to be placed upon and rest upon edge 24 in a secure manner. For example, in the event reservoir 11 has a greater diameter than cylindrical wall 51, edge 24 is received upon bevel 73 and the inclined surface thereof permits cylindrical wall 51 to be securely nested upon reservoir 11. Conversely, in the event reservoir 11 has a diameter smaller than cylindrical wall 51, edge 24 is received upon beveled surface 72 permitting again, the firm nesting and coupling of cylindrical wall 51 to reservoir 11.

In accordance with an important aspect of the embodiment shown in FIGS. 5 through 7 of the present invention, the entire structure is readily washable and may be cleaned and used repeatedly. For example, in the case of water soluable paints, a simple hosing or spraying of water upon the embodiment shown in FIG. 5 will provide sufficient cleaning in most instances to permit resuse of paint strainer 50. In addition, strainer bag 61 may be replaced after each use to avoid the need of cleaning it.

What has been shown is an improved paint strainer which readily nests upon and may be secured to a conventional paint reservoir and which may be utilized to remove particles or lumps from paint prior to its use. In one embodiment, the present invention strainer is disposable while in the alternate embodiment a structure capable of repeated use and cleaning is presented.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in straining a liquid paint and depositing the same within a reservoir container, an improved paint strainer comprising:

an upwardly extending continuous closed wall support defining a plurality of facets formed into a closed faceted wall having upper and lower edges and defining an upper opening and a lower opening and a passage therebetween;

means for removeably attaching said wall support to said reservoir container at said lower opening including a recessed groove defined in said lower edge of said closed wall support; and a strainer bag formed of a mesh material and defining a tapered cross-section and a closed end and an open end, said open end of said strainer bag extending the breadth of and being secured to said upper opening of said wall support in a removeable attachment and said closed and extending downwardly within said passage, said facets being connected in a hinged manner such that said wall support may be folded between a closed position in which said facets are collapsed upon each other and said passage is reduced and an open position in which the cross-section of said passage is maximum.

2. An improved paint strainer as set forth in claim 1 wherein said lower edges of said facets each define a plurality of notches extending upwardly from said lower edges.

3. An improved paint strainer as set forth in claim 2 wherein said wall support defines four equal facets.

4. An improved paint strainer as set forth in claim 3 wherein said faceted wall support is formed of cardboard material.

5. An improved paint strainer as set forth in claim 4 wherein said strainer bag overlaps a portion of said wall support and is secured thereto by an adhesive.

6. For use in straining a liquid paint and depositing the same within a reservoir container, having a generally cylindrical container edge, an improved paint strainer comprising:

an upwardly extending continuous closed wall support defining a plurality of facets formed into a closed faceted wall having upper and lower edges and an upper opening and a lower opening and a passage therebetween, said facets being connected in a hinged manner such that said wall support may be folded between a closed position in which said facets are collapsed upon each other and said passage is reduced and an open position in which the cross section of said passage is maximum;

means for removably attaching said wall support to said reservoir container at said lower opening; and a strainer bag formed of a mesh material and defining a closed end and an open end, said open end of said strainer bag extending the breadth of and being secured to said upper opening of said wall support and said closed end extending downwardly within said closed wall support passage, said strainer bag overlapping a portion of said wall support and being secured thereto by an adhesive.

7. An improved paint strainer as set forth in claim 6 wherein said lower edges of said facets each define a plurality of notches extending upwardly from said lower edges.

8. An improved paint strainer as set forth in claim 7 wherein said wall support defines four equal facets.

9. An improved paint strainer as set forth in claim 8 wherein said faceted wall support is formed of cardboard material.

10. A improved paint strainer as set forth in claim 6 wherein said closed wall support defines a handle notch spaced from said upper edge and configured to receive a paint can handle.

* * * * *